United States Patent
Kojima et al.

(10) Patent No.: US 8,948,988 B2
(45) Date of Patent: Feb. 3, 2015

(54) SPEED RATIO CONTROL DEVICE OF CONTINUOUSLY VARIABLE TRANSMISSION FOR VEHICLE

(71) Applicants: Sei Kojima, Okazaki (JP); Kazuya Yoshizawa, Toyota (JP); Taichi Washio, Okazaki (JP)

(72) Inventors: Sei Kojima, Okazaki (JP); Kazuya Yoshizawa, Toyota (JP); Taichi Washio, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/226,028

(22) Filed: Mar. 26, 2014

(65) Prior Publication Data

US 2014/0297142 A1 Oct. 2, 2014

(30) Foreign Application Priority Data

Mar. 29, 2013 (JP) ................................. 2013-074092

(51) Int. Cl.
  G06F 7/00 (2006.01)
  G06F 17/00 (2006.01)
  G06F 19/00 (2011.01)
  F16H 61/66 (2006.01)

(52) U.S. Cl.
  CPC ..................................... F16H 61/66 (2013.01)
  USPC ............................................ 701/58; 477/94

(58) Field of Classification Search
  USPC ........ 701/51, 58, 61, 70, 71; 477/92, 94, 115, 477/144
  See application file for complete search history.

(56) References Cited

U.S. PATENT DOCUMENTS

| 4,899,279 A * | 2/1990 | Cote et al. ........................ 701/37 |
| 7,074,160 B1 * | 7/2006 | Inoue et al. .................... 477/180 |
| 7,841,433 B2 * | 11/2010 | Soliman et al. .......... 180/65.265 |
| 2008/0097674 A1 * | 4/2008 | Kuwahara et al. ............... 701/51 |
| 2012/0041653 A1 * | 2/2012 | Choby ............................ 701/51 |

FOREIGN PATENT DOCUMENTS

| JP | 02271151 A | 11/1990 |
| JP | 03048061 A | 3/1991 |
| JP | 04365645 A | 12/1992 |
| JP | 2003-048462 A | 2/2003 |

* cited by examiner

*Primary Examiner* — Justin Holmes
(74) *Attorney, Agent, or Firm* — Gifford, Krass, Sprinkle, Anderson & Citkowski, P.C.

(57) ABSTRACT

Speed change inhibition control for inhibiting change of the speed ratio of a continuously variable transmission (CVT) is executed when an input shaft speed of the CVT is lower than a predetermined ABS-operating-time upper-limit input shaft speed. Therefore, the speed ratio of the CVT can be changed to the largest reduction ratio until it is determined that the input shaft speed of the CVT is lower than the predetermined ABS-operating-time upper-limit input shaft speed. Thus, during ABS operation of an ABS control device before the vehicle is stopped, the speed ratio can be returned to the largest reduction ratio in a condition where engine brake force is not excessively applied, and sufficient driving force of the vehicle or starting response is obtained when the vehicle is re-started.

7 Claims, 7 Drawing Sheets

SPEED RATIO CONTROL DEVICE OF CONTINUOUSLY VARIABLE TRANSMISSION FOR VEHICLE

INCORPORATION BY REFERENCE

The disclosure of Japanese Patent Application No. 2013-074092 filed on Mar. 29, 2013 including the specification, drawings and abstract is incorporated herein by reference in its entirety.

BACKGROUND OF THE INVENTION

1. Field of the Invention

The invention relates to a speed ratio control device of a continuously variable transmission for a vehicle, and in particular to a technology for curbing change of the speed ratio and maintaining a braking effect during ABS operation caused by a braking operation on the vehicle, and also maintaining re-acceleration performance by changing the speed ratio of the continuously variable transmission to the largest possible reduction ratio.

2. Description of Related Art

In a vehicle having a continuously variable transmission and an antilock brake control device (ABS), if a speed changing operation for changing the speed ratio of the continuously variable transmission toward the largest speed ratio before the vehicle is stopped is performed, during operation of the antilock brake control device for intermittently braking the wheels so as to increase the braking force on a low μ road, the engine brake force increases, and the braking operation of the ABS may be affected by the increased engine brake force.

To deal with the above situation, control for fixing the speed ratio of the continuously variable transmission when slipping of a driving wheel is determined, control for immediately changing the speed ratio of the continuously variable transmission toward the largest speed reduction ratio when the deceleration of the vehicle becomes equal to or larger than a first threshold value, and immediately inhibiting change of the speed ratio toward the largest speed reduction ratio when the deceleration becomes equal to or larger than a second threshold value, or control for inhibiting the speed ratio of the continuously variable transmission from being larger than a given value when the antilock brake control device is in operation, has been proposed. For example, technologies described in Japanese Patent Application Publication No. 04-365645 (JP 04-365645 A) correspond to one or more of the above controls.

According to a speed ratio control device of a vehicular continuously variable transmission described in JP 04-365645 A identified above, the engine brake force is less likely or unlikely to increase when the ABS is in operation, thus assuring the braking operation of the ABS.

In the meantime, according to the speed ratio control device of the vehicular continuously variable transmission of the related art, even in the case where the antilock brake control device operates to bring the vehicle into a sudden stop, the speed ratio of the continuously variable transmission may not reach the largest reduction ratio, and sufficient starting response may not be obtained due to a shortage of driving force when the vehicle is re-started.

SUMMARY OF THE INVENTION

The invention provides a speed ratio control device of a vehicular continuously variable transmission, which is able to return the speed ratio to the largest speed reduction ratio in a condition where engine brake force is not excessively applied, during operation of an antilock brake control device before the vehicle is stopped, thus assuring high re-acceleration performance of the vehicle when it is re-started.

According to one aspect of the invention, a speed ratio control device of a vehicular continuously variable transmission for a vehicle having a continuously variable transmission and an antilock brake control device includes a speed ratio controller configured to execute speed change inhibition control for inhibiting at least downshift of the continuously variable transmission during operation of the antilock brake control device. In the speed ratio control device, the speed ratio controller is configured to execute the speed change inhibition control when an input shaft speed or a speed ratio of the continuously variable transmission is lower than a predetermined upper limit value.

According to the speed ratio control device of the vehicular continuously variable transmission configured as described above, when the input shaft speed or speed ratio of the continuously variable transmission is lower than the predetermined upper limit value, speed change inhibition control for inhibiting at least downshift of the continuously variable transmission or change of the speed ratio toward the largest speed reduction ratio is executed. Therefore, the speed ratio of the continuously variable transmission can be changed toward the largest reduction ratio until it is determined that the input shaft speed or speed ratio of the continuously variable transmission is lower than the predetermined upper limit value. Thus, during operation of the antilock brake control device before the vehicle is stopped, the speed ratio can be returned to the largest reduction ratio in a condition where the engine brake force is not excessively applied, so that sufficient driving force of the vehicle when re-started, or sufficient starting response, can be obtained.

In the speed ratio control device as described above, the speed ratio controller may be configured to permit only upshift of the continuously variable transmission when the input shaft speed or speed ratio of the continuously variable transmission is equal to or higher than the predetermined upper limit value. With the controller thus configured, when the input shaft speed or speed ratio of the continuously variable transmission is equal to or higher than the predetermined upper limit value, the engine brake force is prevented from being excessively applied, and therefore, locking of the driving wheels of the vehicle during ABS operation can be quickly resolved.

In the speed ratio control device as described above, the upper limit value may be an upper-limit input shaft speed calculated based on an actual vehicle speed and a target input shaft speed, from a pre-stored relationship between the vehicle speed and the target input shaft speed of the continuously variable transmission, and the upper-limit input shaft speed. With the upper limit value thus determined, when the input shaft speed or speed ratio of the continuously variable transmission during operation of the antilock brake control device is equal to or higher than the predetermined upper limit value, for example, when the accelerator pedal is returned to the original position or a braking operation is performed after the accelerator pedal is kicked down (a kickdown operation), the continuously variable transmission is shifted up so that the actual input shaft speed is made equal to the target input shaft speed, and the actual input shaft speed is reduced toward the target input shaft speed.

Also, the upper limit value may be an upper-limit speed ratio calculated based on an actual vehicle speed, a target input shaft speed of the continuously variable transmission, and an output shaft speed thereof, from a relationship between the vehicle speed, the target input shaft speed and the output shaft speed, and the upper-limit speed ratio. With the upper limit value thus determined, when the speed ratio of the continuously variable transmission is equal to or larger than the predetermined upper limit value during operation of the antilock brake control device, for example, when the accelerator pedal is returned to the original position or a braking operation is performed after the accelerator pedal is kicked down (a kickdown operation), the continuously variable transmission is shifted up so that the actual speed ratio is made equal to the target speed ratio, and the actual speed ratio is reduced toward the upper-limit speed ratio.

In the speed ratio control device as described above, the speed ratio controller may be configured to determine a target input shaft speed or a target speed ratio during operation of the antilock brake control device, when no speed change inhibition request is generated during operation of the antilock brake control device, and the speed ratio controller may be configured to execute speed ratio control so as to achieve the target input shaft speed or the target speed ratio, when the target input shaft speed or the target speed ratio is lower than the upper limit value. With the speed ratio controller thus configured, when no speed change inhibition request is generated during operation of the antilock brake control device, the speed ratio is allowed to be changed in a condition where the target input shaft speed or the target speed ratio is lower than the upper limit value. Thus, the speed ratio can be returned to the largest speed reduction ratio during ABS operation, and sufficient driving force or high starting response can be obtained when the vehicle is re-started.

In the speed ratio control device as described above, the speed ratio controller may be configured to limit the target input shaft speed or the target speed ratio to the upper limit value, when the target input shaft speed or the target speed ratio is equal to or higher than the upper limit value. In this manner, under speed ratio control performed when the speed ratio is not inhibited from being changed during ABS operation, the target input shaft speed or the target speed ratio is prevented from exceeding the upper limit value, so that the rate of change of the speed ratio under the speed ratio control is reduced.

In the speed ratio control device as described above, the target speed ratio during operation of the antilock brake control device may be a value obtained by dividing a difference between a largest speed reduction ratio and an actual speed ratio by the vehicle speed, and multiplying a result of division by a vehicle deceleration, and the target input shaft speed during operation of the antilock brake control device may be a value obtained by multiplying the target speed ratio by an output shaft speed of the continuously variable transmission. In this case, the speed ratio of the continuously variable transmission is changed at an appropriate rate toward the largest speed reduction ratio.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

One embodiment of the invention will be described in detail with reference to the drawings.

Figure 1:
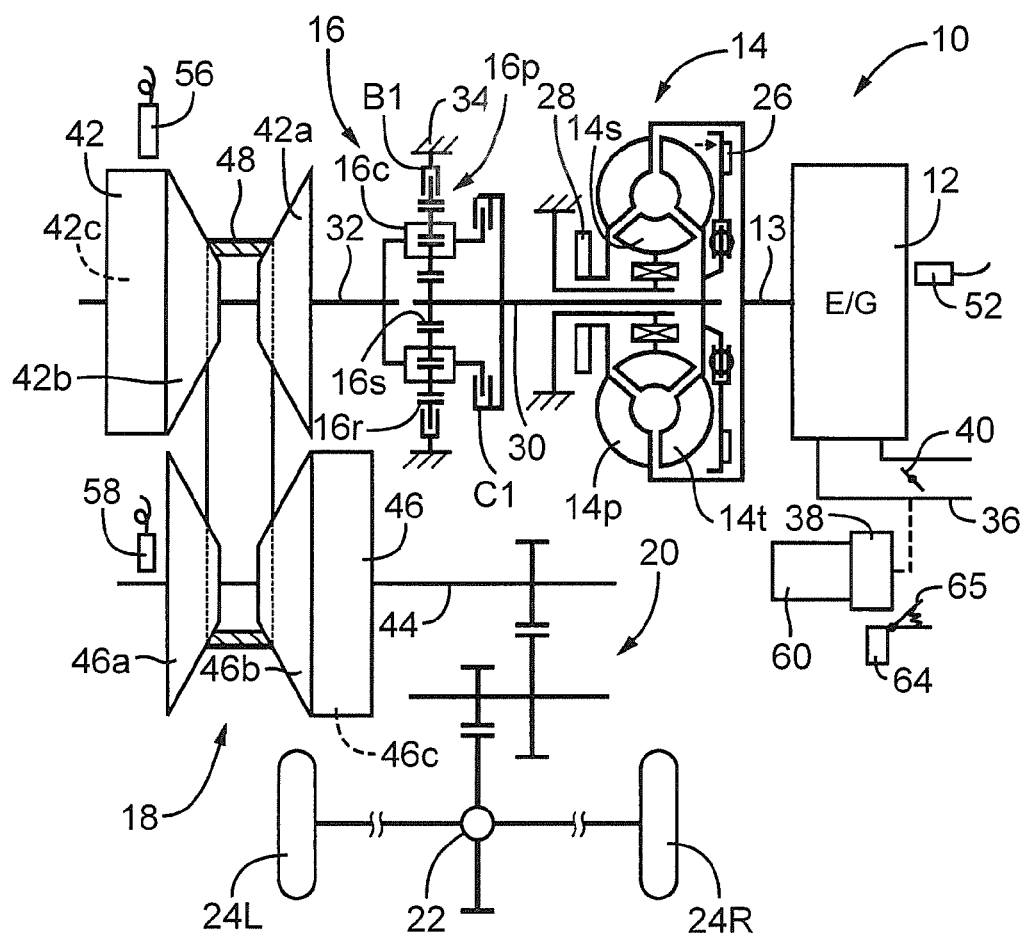
FIG. 1 is a view schematically illustrating the arrangement of a power transmission path of a vehicle including a continuously variable transmission to which the invention is applied.

FIG. 1 schematically illustrates the arrangement of a power transmission path from an engine 12 to drive wheels 24, which path is included in a vehicle 10 to which this invention is applied. In FIG. 1, power generated by the engine 12 is transmitted to front wheels 24L and 24R as right and left drive wheels, via a torque converter 14 with a lock-up clutch as a hydraulic power transmission device, a vehicular continuously variable transmission 18, a speed reducing gear device 20, a differential gear device 22, and so forth.

The torque converter 14 includes a pump wheel 14p coupled to a crankshaft 13 of the engine 12, a turbine wheel 14t coupled to a forward/reverse drive switching device 16 via a turbine shaft 30 corresponding to an output-side member of the torque converter 14, and a stator wheel 14s that is inhibited by a one-way clutch from rotating in one direction. In operation, power is transmitted between the pump wheel 14p and the turbine wheel 14t via fluid. Namely, in the torque converter 14 of this embodiment, the pump wheel 14p and the turbine wheel 14t correspond to an input rotary member and an output rotary member, respectively, and power of the engine 12 is transmitted toward the continuously variable transmission 18 via the fluid. Also, a lock-up clutch 26 that directly couples the pump wheel 14p and the turbine wheel 14t, i.e., the input and output rotary members of the torque converter 14, with each other is provided between the pump wheel 14p and the turbine wheel 14t. Also, a mechanical oil pump 28 is coupled to the pump wheel 14p. The oil pump 28 is rotated or driven by the engine 12 so as to produce hydraulic pressure that provides an original pressure for controlling the speed ratio of the continuously variable transmission 18, generating a belt clamping pressure of the continuously variable transmission 18, controlling operation of the lock-up clutch 26, or supplying lubricating oil to various parts.

The forward/reverse drive switching device 16 principally consists of a forward clutch C1 as a starting clutch, a reverse brake B1, and a double pinion type planetary gear device 16p having a sun gear 16s, a carrier 16c and a ring gear 16r. The turbine shaft 30 of the torque converter 14 is coupled integrally to the sun gear 16s, and an input shaft 32 of the continuously variable transmission 18 is coupled integrally to the carrier 16c, while the carrier 16c and the sun gear 16s are selectively coupled via the forward clutch C1, and the ring gear 16r is selectively fixed to a housing 34 as a non-rotary member via the reverse brake B1. The forward clutch C1 and the reverse brake B1 serve as certain friction devices that transmit power of the engine 12 toward the drive wheels 24 when engaged, more specifically, hydraulic friction devices that are frictionally engaged by means of hydraulic cylinders.

When the forward clutch C1 is engaged and the reverse brake B1 is released, the forward/reverse drive switching device 16 is rotated as a unit, so that the turbine shaft 30 is directly coupled to the input shaft 32, and a forward power transmission path is established through which forward driving force is transmitted to the continuously variable transmission 18. When the reverse brake B1 is engaged and the forward clutch C1 is released, a reverse power transmission path is established in the forward/reverse drive switching device 16, and the input shaft 32 is rotated in the reverse direction relative to the turbine shaft 30, so that reverse driving force is transmitted to the continuously variable transmission 18. When the forward clutch C1 and the reverse brake B1 are both released, the forward/reverse drive switching device 16 is brought into a neutral state (power transmission cutoff state) in which power transmission is cut off.

While an internal combustion engine, such as a gasoline engine or a diesel engine, which generates power by burning fuel, for example, is used as the engine 12, another type of prime mover, such as an electric motor, may be employed in combination with the engine. A throttle valve 40 is provided in an intake pipe 36 of the engine 12. In operation, the throttle valve 40 is electrically controlled using a throttle actuator 38 so that the intake air amount Q of the engine 12 varies with the accelerator operation amount Acc.

The continuously variable transmission 18 includes a pair of variable pulleys 42, 46, and a transmission belt 48 extended between the variable pulleys 42, 46. One of the variable pulleys 42, 46, i.e., a driving pulley (primary pulley, primary sheave) 42 whose effective diameter is variable is provided as an input-side member on the input shaft 32, and the other variable pulley, i.e., a driven pulley (secondary pulley, secondary sheave) 46 whose effective diameter is variable is provided as an output-side member on an output shaft 44 of the continuously variable transmission 18. Thus, the continuously variable transmission 18 is a belt-type continuously variable transmission that transmits power via frictional force between the pair of variable pulleys 42, 46 and the transmission belt 48.

The driving pulley 42 includes a fixed rotor 42a fixed to the input shaft 32, a movable rotor 42b that is unable to rotate relative to the input shaft 32 about its axis but is able to move in the axial direction, and a driving-side hydraulic cylinder (primary-pulley-side hydraulic cylinder) 42c as a hydraulic actuator that produces thrust for changing the width of a V-groove between the rotors 42a, 42b. The driven pulley 46 includes a fixed rotor 46a fixed to the output shaft 44, a movable rotor 46b that is unable to rotate relative to the output shaft 44 about its axis but is able to move in the axial direction, and a driven-side hydraulic cylinder (secondary-pulley-side hydraulic cylinder) 46c as a hydraulic actuator that produces thrust for changing the width of a V-groove between the rotors 46a, 46b. In the continuously variable transmission 18 thus constructed, the amount of hydraulic oil supplied to or discharged from the driving-side hydraulic cylinder 42c, for example, is controlled by a speed ratio control valve 72 (FIG. 2) provided in a hydraulic control circuit (not shown), so that the V-groove widths of the pair of variable pulleys 42, 46 are changed, and the engaging diameter (effective diameter) of the transmission belt 48 is changed. As a result, the speed ratio γ (=input shaft speed Nin/output shaft speed Nout) is continuously changed. Also, a secondary pressure Pout (corresponding to the belt clamping pressure Pd) as a hydraulic pressure of the driven-side hydraulic cylinder 46c is regulated or controlled by a clamping force control valve 70 (FIG. 2) provided in the hydraulic control circuit, so that the frictional force (belt clamping force) between the pair of variable pulleys 42, 46 and the transmission belt 48 is controlled in accordance with the secondary pressure Pout so as to prevent the transmission belt 48 from slipping. As a result of the control, a primary pressure (speed ratio control pressure) Pin as a hydraulic pressure of the driving-side hydraulic cylinder 42c is developed.

Figure 2:
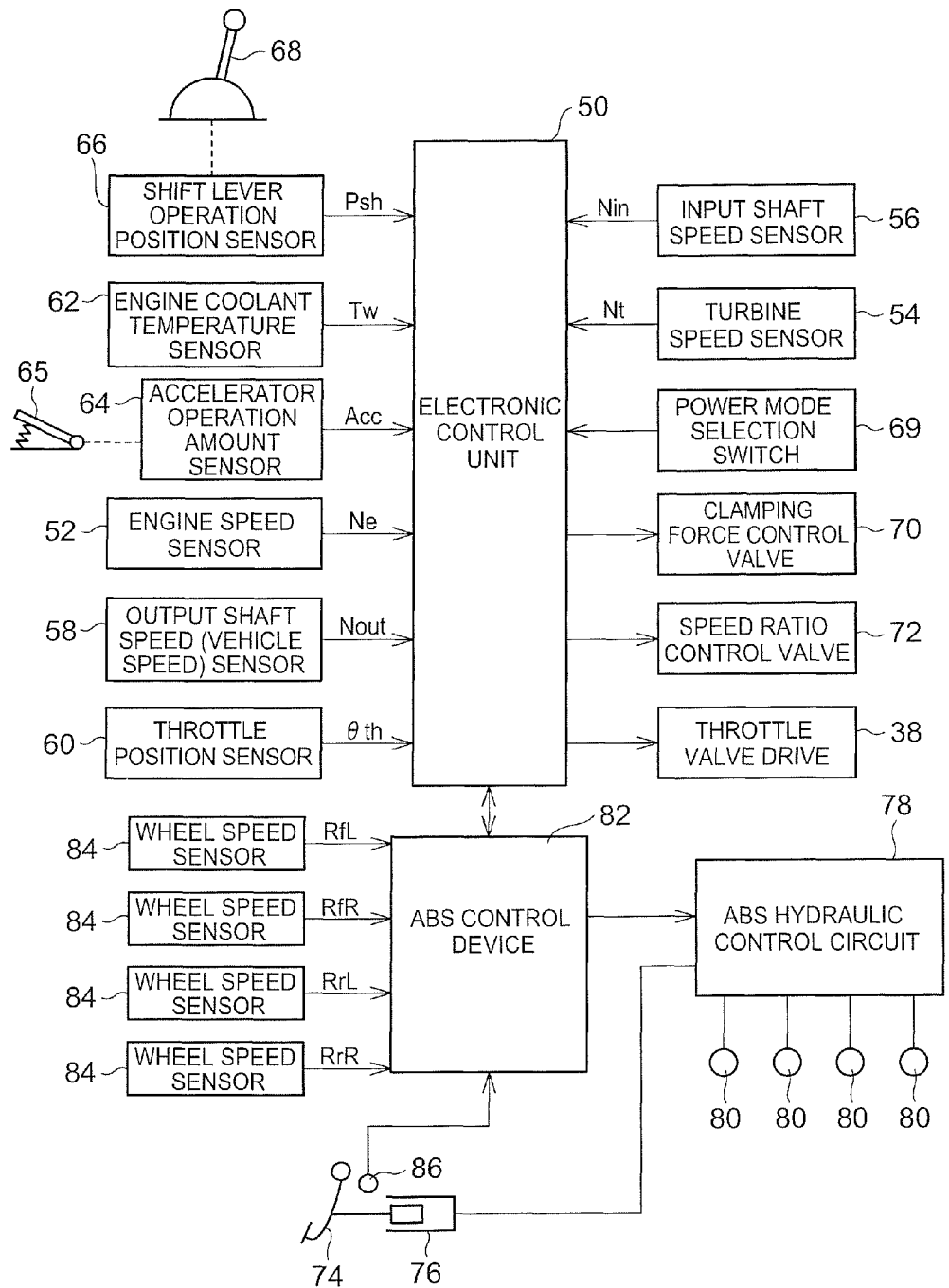
FIG. 2 is a block diagram useful for explaining principal parts of a control system provided in the vehicle of FIG. 1.

FIG. 2 is a block diagram useful for explaining principal parts of a control system provided in the vehicle 10 for controlling the engine 12, continuously variable transmission 18, and so forth. In FIG. 2, the vehicle 10 is provided with an electronic control unit 50 including a speed ratio control device involved with speed ratio control of the continuously variable transmission 18, for example. The electronic control unit 50 includes a so-called microcomputer having CPU, RAM, ROM, input and output interfaces, etc., and executes various controls of the vehicle 10 by performing signal processing according to programs stored in advance in the ROM, while utilizing the temporary storage function of the RAM. For example, the electronic control unit 50 is configured to execute output control of the engine 12, speed ratio control and belt clamping force control of the continuously variable transmission 18, torque capacity control of the lock-up clutch 26, and so forth, and is divided as needed into two or more subunits for engine control, hydraulic control of the continuously variable transmission 18 and the lock-up clutch 26, and so forth.

The electronic control unit 50 is supplied with a signal indicative of the rotational angle (position) ACR of the crankshaft 13 detected by an engine speed sensor 52, for example, and the engine speed Ne (rpm) as the rotational speed of the crankshaft 13 (i.e., the rotational speed of the engine 12), a signal indicative of the turbine speed Nt (rpm) as the rotational speed of the turbine shaft 30 detected by a turbine speed sensor 54, a signal indicative of the input shaft speed Nin (rpm) as the rotational speed of the input shaft 32 of the continuously variable transmission 18 detected by an input shaft speed sensor 56, and a signal indicative of the output shaft speed Nout (rpm) as the rotational speed of the output shaft 44 of the continuously variable transmission 18 corresponding to the vehicle speed V, which is detected by an output shaft speed sensor 58 that also functions as a vehicle speed sensor. The electronic control unit 50 is also supplied with a signal indicative of the throttle opening θth (%) as the opening of the electronic throttle valve 40 detected by a throttle position sensor 60, a signal indicative of the coolant temperature Tw (° C.) of the engine 12 detected by an engine coolant temperature sensor 62, a signal indicative of the accelerator operation amount Acc (%) that is the operation amount of the accelerator pedal 65 as an acceleration requirement (driver's request) made on the vehicle 10 by the driver, which is detected by an accelerator operation amount sensor 64, a signal indicative of a selected lever position (operation position) Psh (a selected one of P, R, N, D and M) of a shift lever 68 detected by a shift lever operation position sensor 66, a signal indicative of a selected power mode generated from a power mode selection switch 69 operated by the driver, and so forth.

The electronic control unit 50 outputs, for example, an accelerator operation amount command signal generated so as to make the opening of the throttle valve 40 proportional to or commensurate with the accelerator operation amount Acc, a belt clamping force command signal to the clamping force control valve 70 for making the belt camping force of the continuously variable transmission 18 equal to a necessary and sufficient value, a speed ratio control command signal to the speed ratio control valve 72 for changing the speed ratio γ of the continuously variable transmission 18, and so forth. Thus, the electronic control unit 50 also functions as the speed ratio control device.

When a brake pedal 74 of the vehicle is operated, a braking oil pressure is supplied from a master cylinder 76 to wheel cylinders 80 for braking provided in respective wheels of the vehicle, via an ABS hydraulic control circuit 78. In the ABS hydraulic control circuit 78, a pump, accumulator (reservoir), a three-position control valve controlled by an antilock brake control device 82, and a pressure reduction control valve are provided in a main channel (not shown) connected to each of the wheel cylinders 80, and a two-position control valve controlled by the antilock brake control device 82 is provided between the right and left wheel cylinders. In operation, the hydraulic pressure supplied to each wheel cylinder 80 is controlled according to a command from the antilock brake control device 82.

The above-described antilock brake control device 82 functions as a so-called ABS, and receives wheel rotation signals RfL, RfR, RrL, RrR that respectively represent the rotational speeds of respective wheels from four wheel speed sensors 84 respectively provided on four wheels including the front wheels 24L, 24R and rear wheels (not shown), and a brake operation signal Bk indicative of operation of the brake pedal 74 from a brake operation sensor 86, The antilock brake control device 82 calculates the wheel speed (km/h) of each wheel based on each wheel rotation signal subjected to smoothing processing, and calculates the vehicle body speed (km/h) and the slip ratio of the wheels from the wheel speeds thus calculated. If slip of any wheel is detected, the antilock brake control device 82 controls the ABS hydraulic control circuit 78 so as to prevent the wheel from locking, and optimize the braking force (road surface friction force) of the wheel.

If the antilock brake control device 82 determines that locking of the wheel in question cannot be resolved even if the hydraulic pressures of the wheels cylinders of the front wheels 24L, 24R are relieved so as to reduce the braking force of the wheel, during ABS operation caused by a braking operation, the antilock brake control device 82 outputs a speed change inhibition request for inhibiting at least downshift of the continuously variable transmission 18 to the electronic control unit 50, so as to reduce the effect of engine brake force that would arise from downshifting of the continuously variable transmission 18. In the case where the electronic control unit 50 receives the speed change inhibition request from the antilock brake control device 82, if the input shaft speed Nin of the continuously variable transmission 18 is lower than a predetermined upper limit value of, for example, about 1000 rpm, or an ABS-operating-time upper-limit rotational speed Nin1 (rpm), namely, if the speed ratio γ is smaller than a predetermined upper limit value of about Nin1/Nout, or an ABS-operating-time upper-limit speed ratio γ1, the electronic control unit 50 executes speed change inhibition control for inhibiting at least downshift of the continuously variable transmission 18 so as to reduce the engine brake force applied to the front wheels 24L, 24R.

Figure 3:
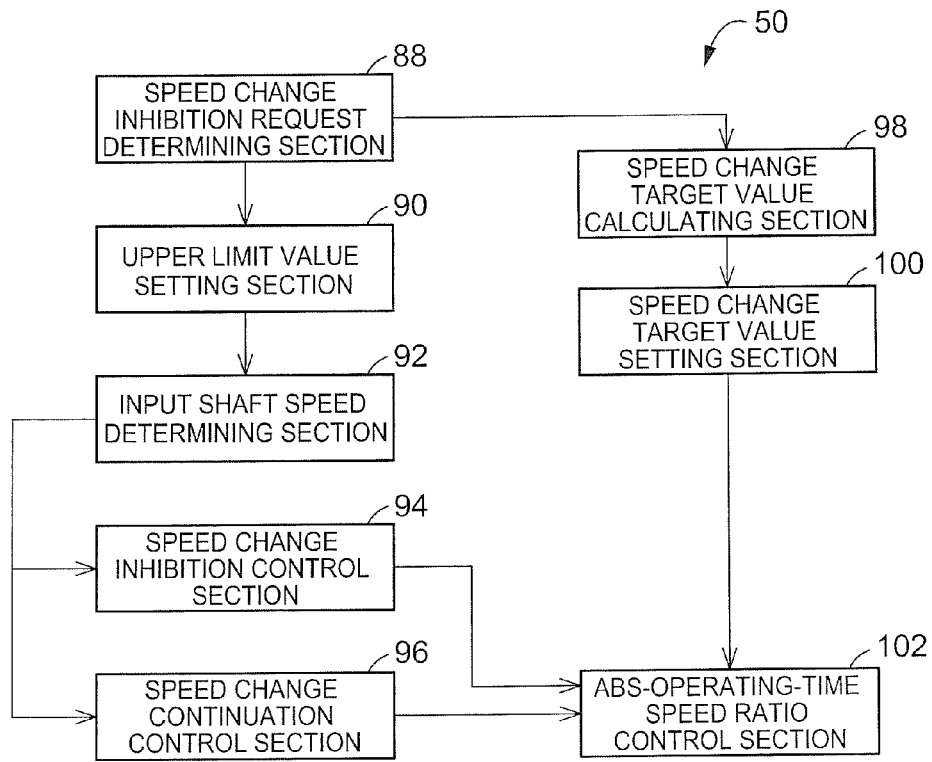
FIG. 3 is a functional block diagram useful for explaining principal control functions of an electronic control unit of FIG. 2.
Figure 4:
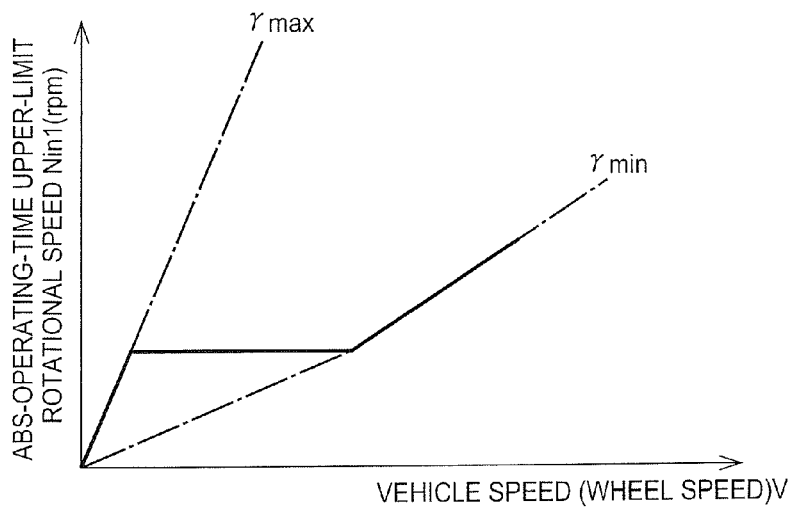
FIG. 4 is a view showing, by way of example, a pre-stored relationship used for determining an ABS-operating-time upper-limit rotational speed in an upper limit value setting section of FIG. 3.

FIG. 3 is a functional block diagram useful for explaining principal speed ratio control functions performed by the electronic control unit 50. In FIG. 3, a speed change inhibition request determining section 88 determines whether a speed change inhibition request is issued from the antilock brake control device 82. If the speed change inhibition request determining section 88 determines that the speed change inhibition request is issued from the antilock brake control device 82, an upper limit value setting section 90 calculates the ABS-operating-time upper-limit rotational speed Nin1 or the ABS-operating-time upper-limit speed ratio γ1, based on the actual vehicle speed V, from a pre-stored relationship between the vehicle speed V as a wheel speed obtained by performing smoothing processing on the average wheel speed of the front wheels 24L, 24R, for example, and the ABS-operating-time upper-limit rotational speed Nin1 or the ABS-operating-time upper-limit speed ratio γ1. The ABS-operating-time upper-limit rotational speed Nin1 or the ABS-operating-time upper-limit speed ratio γ1 represents an upper limit value within a range of input shaft speed in which the speed change inhibition control is performed. The above-indicated relationship, which is shown in FIG. 4 by way of example, is empirically obtained in advance, so as to change the speed ratio γ to the largest possible ratio (i.e., the largest possible speed reduction) before the vehicle is stopped, and also avoid locking of the front wheels (driving wheels) 24L, 24R due to the engine brake effect by inhibiting excessive downshifting during ABS operation.

An input shaft speed determining section 92 determines whether the actual input shaft speed Nin is lower than the ABS-operating-time upper-limit rotational speed Nin1, namely, whether the actual speed ratio γ is smaller than the ABS-operating-time upper-limit speed ratio γ1. If the input shaft speed determining section 92 determines that the actual input shaft speed Nin is lower than the ABS-operating-time upper-limit rotational speed Nin, a speed change inhibition control section 94 instructs a speed ratio control section 102 to execute speed change inhibition control for inhibiting at least downshift of the continuously variable transmission 18. If the input shaft speed determining section 92 determines that the actual input shaft speed Nin is equal to or higher than the ABS-operating-time upper-limit rotational speed Nin1, a speed change continuation control section 96 generates a command to continue speed changing operation to perform at least upshift of the continuously variable transmission 18, to the speed ratio control section 102.

If the speed change inhibition request determining section 88 determines that no speed change inhibition request is issued from the antilock brake control device 82, a speed change target value calculating section 98 calculates an ABS-operating-time target speed ratio γ* based on the actual speed ratio γ, vehicle speed V, and the vehicle deceleration G, from a pre-stored relationship expressed by Eq. (1) below. Also, the speed change target value calculating section 98 calculates an ABS-operating-time target input shaft speed Nin* (=γ*× Nout), based on the ABS-operating-time target speed ratio γ* and the output shaft speed Nout. According to Eq. (1), as the vehicle deceleration G decreases during ABS operation, the ABS-operating-time target speed ratio γ* or the ABS-operating-time target input shaft speed Nin* is reduced. In Eq. (1), γmax represents the largest speed ratio or the largest speed reduction. The vehicle speed V may be calculated from the smoothened wheel speed, and G may be calculated from the rate of change of the smoothened wheel speed.

$$\gamma^* = (\gamma max - \gamma)/(V/G) \tag{1}$$

When the ABS-operating-time target input shaft speed Nin* calculated by the speed change target value calculating section 98 is lower than a preset limit value, or an ABS-operating-time limit input shaft speed Nin2 (rpm), namely, the ABS-operating-time target speed ratio γ* is smaller than an ABS-operating-time limit speed ratio γ2 as a predetermined limit value, a speed change target value setting section 100 sets the value as it is as a speed change target value. However, when the target input shaft speed Nin* or the target speed ratio γ* is higher or larger than the limit input shaft speed Nin2 (rpm) or the limit speed ratio γ2, the speed change target value setting section 100 sets and limits the target input shaft speed Nin* or the target speed ratio γ* to the ABS-operating-time limit input shaft speed Nin2 or the ABS-operating-time limit speed ratio γ2. The ABS-operating-time limit input shaft speed Nin2 (rpm) and the ABS-operating-time limit speed ratio γ2 may be the same values as the ABS-operating-time upper-limit rotational speed Nin1 and the ABS-operating-time upper-limit speed ratio γ1. For example, the ABS-operating-time limit input shaft speed Nin2 (rpm) and the ABS-operating-time limit speed ratio γ2 may be a value around 1000 (rpm). An ABS-operating-time speed ratio control section 102 controls the speed ratio of the continuously variable transmission 18 in a feedback fashion, so that the actual input shaft speed Nin becomes equal to the ABS-operating-time target input shaft speed Nin*, or the actual speed ratio γ becomes equal to the ABS-operating-time target speed ratio γ*.

Figure 5:
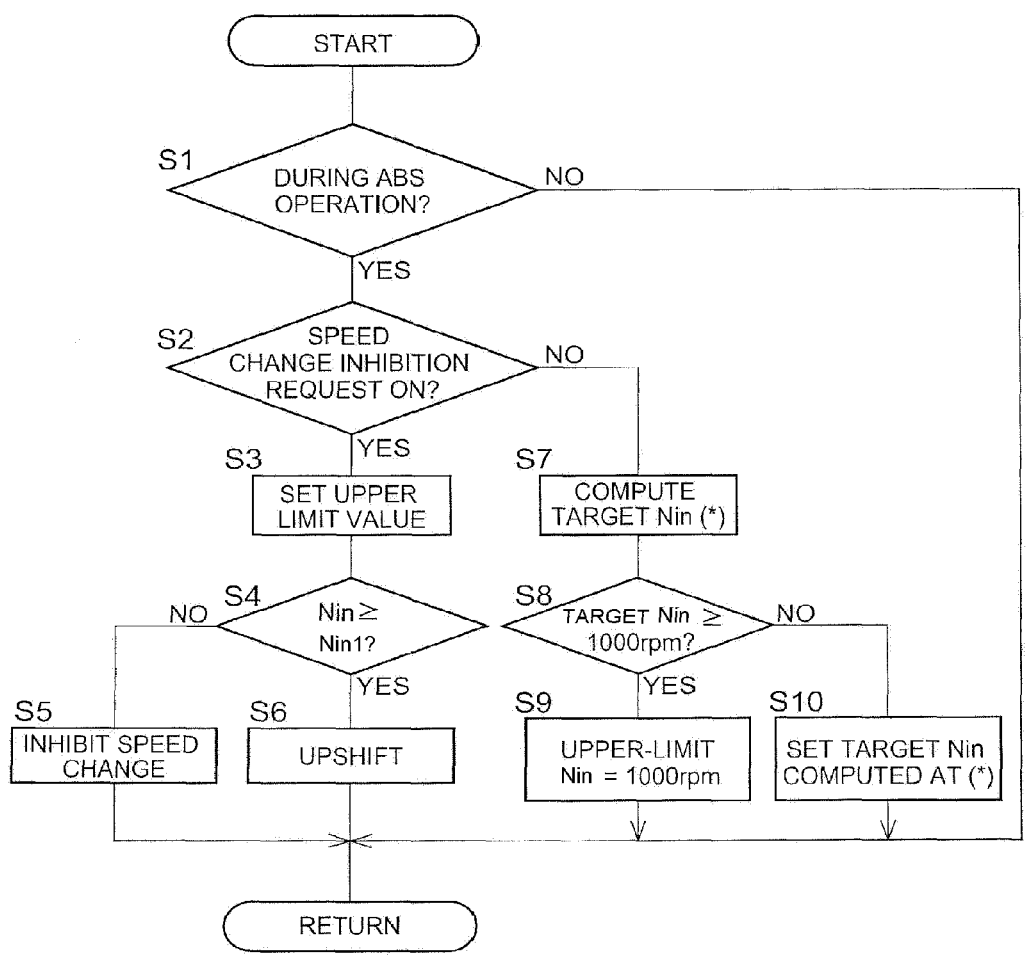
FIG. 5 is a flowchart explaining a principal part of control operation of the electronic control unit of FIG. 2.
Figure 6:
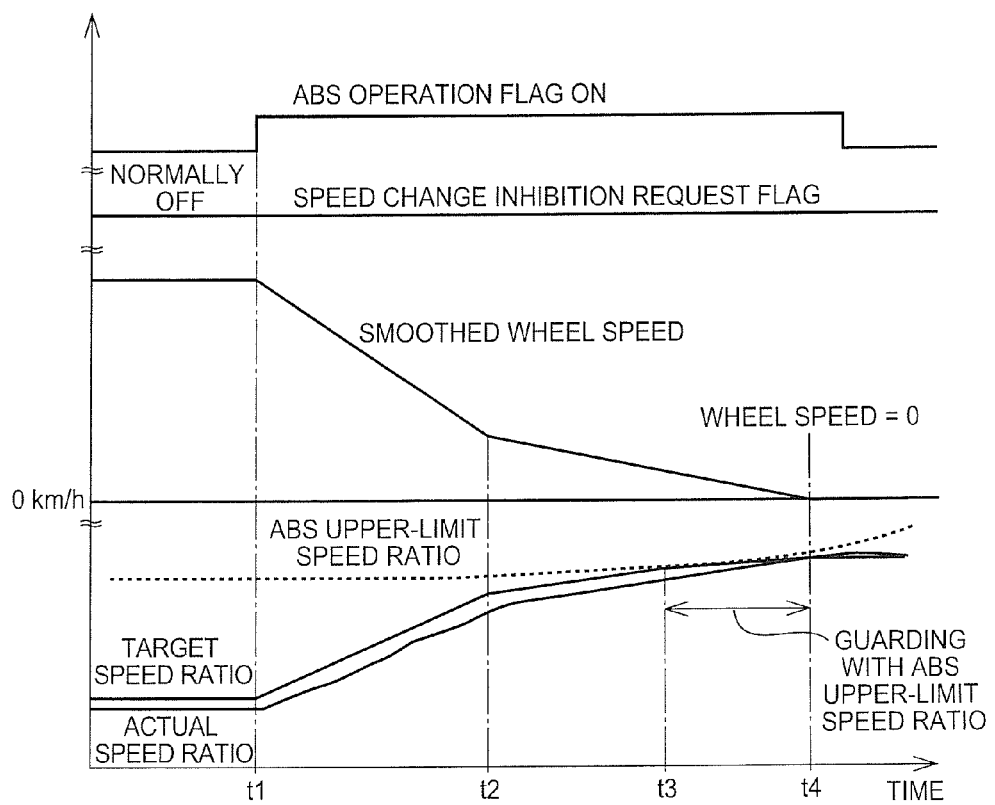
FIG. 6 is a time chart explaining a principal part of control operation of the electronic control unit of FIG. 2.
Figure 7:
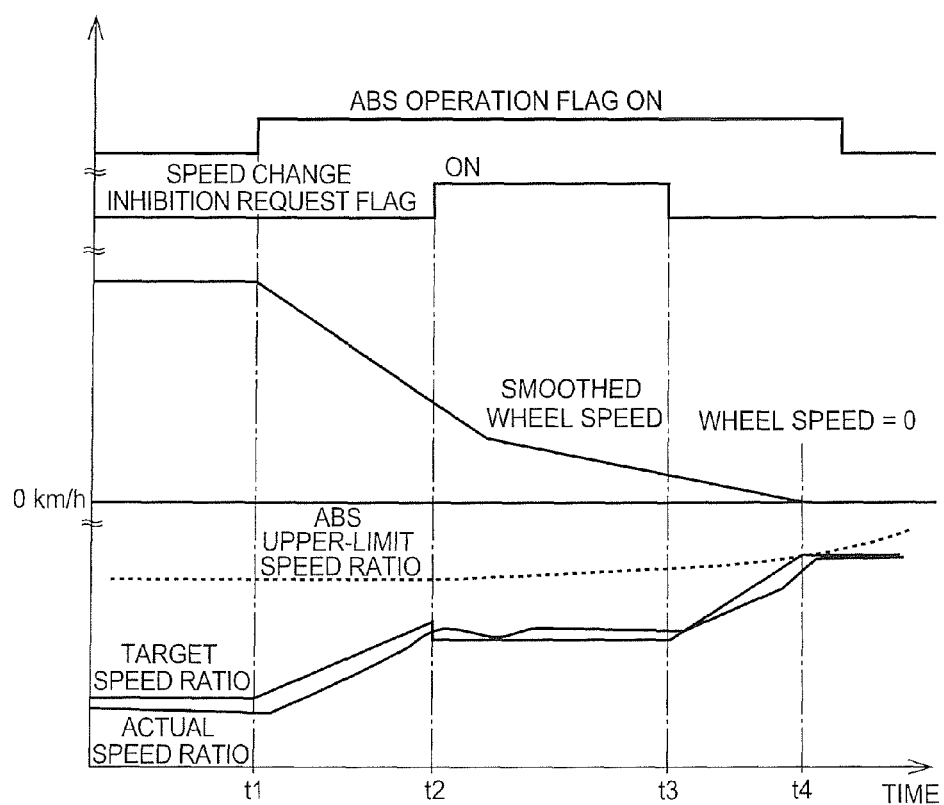
FIG. 7 is a time chart explaining a principal part of control operation of the electronic control unit of FIG. 2.
Figure 8:
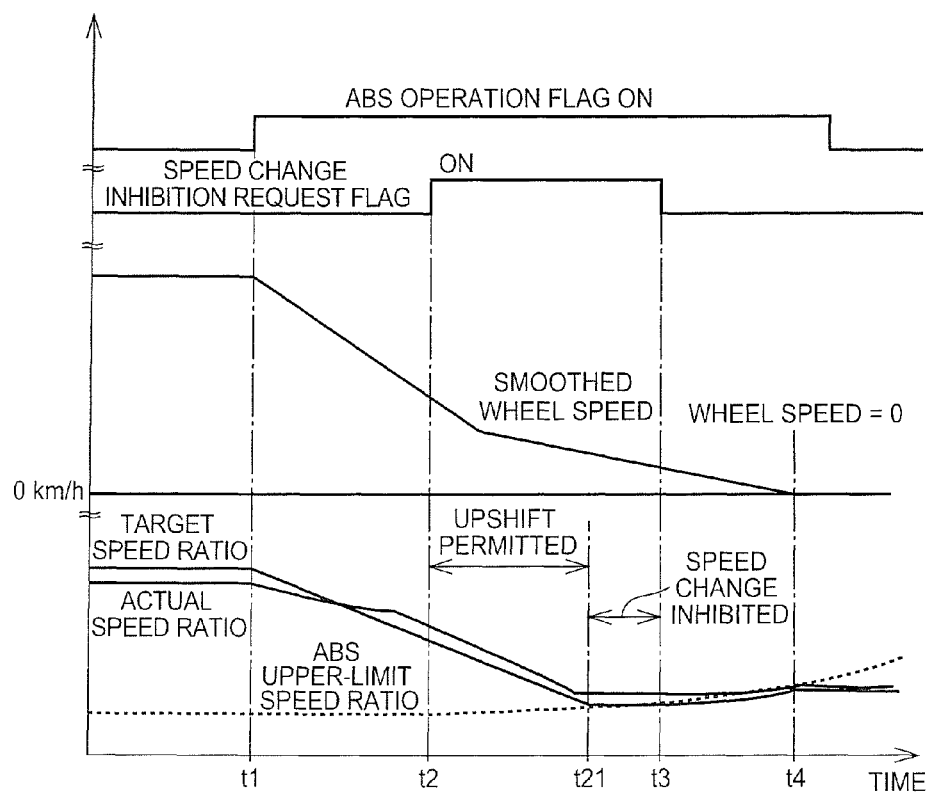
FIG. 8 is a time chart explaining a principal part of control operation of the electronic control unit of FIG. 2.

FIG. 5 is a flowchart explaining a principal part of control operation of the electronic control unit 50, namely, speed ratio control of the continuously variable transmission 18 performed during ABS operation. The control routine of FIG. 5 is repeatedly executed at an extremely short cycle of about several milliseconds to several tens of milliseconds. FIG. 6, FIG. 7, and FIG. 8 are time charts explaining operation when the control routine illustrated in the flowchart of FIG. 5 is executed. In FIG. 6, FIG. 7, and FIG. 8, "t1" denotes a start time of ABS operation, namely, a point in time at which the control routine of FIG. 5 starts being executed. FIG. 6 shows operation in the case where the ABS-operating-time target speed ratio γ* or the actual speed ratio γ controlled toward the target speed ratio γ* is smaller than the ABS-operating-time upper-limit speed ratio γ1 at the start of ABS operation, and no speed change inhibition command is issued from the ABS control device 82. FIG. 7 shows operation in the case where the ABS-operating-time target speed ratio γ* or the actual speed ratio γ controlled toward the target speed ratio γ* is smaller than the ABS-operating-time upper-limit speed ratio γ1 at the start of ABS operation, and a speed change inhibition command is issued from the ABS control device 82. FIG. 8 shows operation in the case where the ABS-operating-time target speed ratio γ* or the actual speed ratio γ controlled toward the target speed ratio γ* is higher than the ABS-operating-time upper-limit speed ratio γ1 at the start of ABS operation, for example, the case where a braking operation is performed after a large downshift caused by a kickdown operation, and a speed change inhibition command is issued from the ABS control device 82.

In FIG. 5, it is determined in step S1 whether the vehicle is in ABS operation, based on an output signal from the ABS control device 82. If a negative decision (NO) is made in step S1, the routine of FIG. 5 ends. If an affirmative decision (YES) is made in step S1, it is determined in step S2 corresponding to the speed change inhibition request determining section 88 whether a speed change inhibition request is issued from the ABS control device 82. Since a negative decision (NO) is made in step S2 in the initial cycle of the routine, step S7 corresponding to the speed change target value calculating section 98 is executed to calculate the ABS-operating-time target speed ratio γ* from the pre-stored relationship expressed by Eq. (1), based on the actual speed ratio γ, vehicle speed V, and the vehicle deceleration G. Also, the ABS-operating-time target input shaft speed Nin* (=γ*×Nout) is calculated based on the ABS-operating-time target speed ratio γ* and the actual output shaft speed Nout.

Then, a speed change target value is set in steps S8 to S10 corresponding to the speed change target value setting section 100. Initially, it is determined in step S8 whether the ABS-operating-time target speed ratio γ* calculated according to Eq. (1) or the ABS-operating-time target input shaft speed Nin* calculated from the target speed ratio γ* is greater than the ABS-operating-time limit speed ratio γ2 or the ABS-operating-time limit input shaft speed Nin2 (rpm) set to 1000 (rpm), for example. If an affirmative decision (YES) is made in step S8, step S9 is executed to limit the ABS-operating-time target speed ratio γ* to the ABS-operating-time limit speed ratio γ2, or limit the ABS-operating-time target input shaft speed Nin* to the ABS-operating-time limit input shaft speed Nin2 (rpm) equal to 1000 (rpm), for example. If a negative decision (NO) is made in step S8, the ABS-operating-time target speed ratio γ* calculated according to Eq. (1) or the ABS-operating-time target input shaft speed Nin* calculated from the target speed ratio γ* is set as it is as a control target value.

In the ABS-operating-time speed ratio control section 102 of FIG. 3, the speed ratio of the continuously variable transmission 18 is controlled in a feedback fashion so that the actual speed ratio γ or input shaft speed Nin follows the ABS-operating-time target speed ratio γ* or ABS-operating-time target input shaft speed Nin* set as described above. This condition is shown in a zone between time t1 and time t4 in FIG. 6, and a zone between time t1 and time t4 in FIG. 7 and FIG. 8. In this zone, as the deceleration G of the vehicle is reduced due to the ABS operation, the ABS-operating-time target speed ratio γ* obtained according to Eq. (1) or the ABS-operating-time target input shaft speed Nin* calculated from the target speed ratio γ* is reduced in relation to the deceleration G, and the rate of change of the speed ratio is reduced. This condition is shown in a zone between time t2 and time t3. Then, if the ABS-operating-time target speed ratio γ* further increases and reaches the ABS-operating-time limit speed ratio γ2, the target speed ratio γ* is limited by the limit speed ratio γ2. This condition is shown in a zone between time t3 and time t4 in FIG. 6. Time t4 represents a point in time at which the vehicle is stopped. Thus, during ABS operation, the ABS-operating-time target speed ratio γ* or the ABS-operating-time target input shaft speed Nin* is determined to be smaller as the deceleration G of the vehicle becomes smaller. As a result, engine brake force is reduced or less likely to be generated, for prevention of locking of the wheels, thus assuring braking performance during ABS operation.

When a speed change inhibition command is issued from the ABS control device 82 during ABS operation, an affirmative decision (YES) is made in step S2. This condition is shown in a zone between time t2 and time t4 in FIG. 7 and FIG. 8. In this condition, in step S3 corresponding to the upper limit value setting section 90, the ABS-operating-time upper-limit rotational speed Nin1 or the ABS-operating-time upper-limit speed ratio γ1 is calculated based on the actual vehicle speed V, from the pre-stored relationship shown in FIG. 4 between the vehicle speed V as the wheel speed obtained by performing smoothing operation on the average wheel speed of the front wheels 24L, 24R, for example, and the ABS-operating-time upper-limit rotational speed Nin1 or the ABS-operating-time upper-limit speed ratio γ1.

Then, it is determined in step S4 corresponding to the input shaft speed determining section 92 whether the actual input shaft speed Nin is lower than the ABS-operating-time upper-limit rotational speed Nin1, namely, whether the actual speed ratio γ is smaller than the ABS-operating-time upper-limit speed ratio γ1. If a positive decision (YES) is made in step S4, an upshift permission command is generated to the ABS-operating-time speed ratio control section 102 in step S6 corresponding to the speed change continuation control section 96, and upshift is permitted under the ABS-operating-time speed ratio control. This condition is shown in a zone between time t2 to time t21 in FIG. 8. In this condition, the actual speed ratio γ is caused to follow the ABS-operating-time target speed ratio γ* even if the actual speed ratio γ exceeds the target speed ratio γ*. If a negative decision (NO) is made in step S4, a speed change inhibition command for inhibiting at least downshift is generated to the ABS-operating-time speed ratio control section 102, in step S5 corresponding to the speed change inhibition control section 94. This condition is shown in a zone from time t2 to time t3 in FIG. 7 and a zone from time t21 to time t3 in FIG. 8. In this speed change inhibiting condition, the actual speed ratio γ is fixed, or downshift is inhibited, so that speed change inhibition control under which the engine brake force is inhibited from increasing in the driving wheels 24L, 24R is executed, and the driving wheels 24L, 24R are prevented from locking.

If the output of the speed change inhibition request from the ABS control device 82 is stopped through the above operation, step S7 and subsequent steps as described above are executed, and the ABS-operating-time speed ratio control is performed by the ABS-operating-time speed ratio control section 102. This condition is shown in a zone from time t3 to time t4 in FIG. 7 and FIG. 8.

As described above, according to the electronic control unit 50 of this embodiment, when the input shaft speed Nin or speed ratio γ of the continuously variable transmission 18 is lower/smaller than the predetermined ABS-operating-time upper-limit input shaft speed Nin1 or ABS-operating-time upper-limit speed ratio γ1, speed change inhibition control for inhibiting at least downshift of the continuously variable transmission 18 or change to the largest reduction ratio is executed. Therefore, the speed ratio γ of the continuously variable transmission 18 can be changed to the largest reduction ratio until it is determined that the input shaft speed Nin or speed ratio γ of the continuously variable transmission 18 is lower/smaller than the predetermined ABS-operating-time upper-limit input shaft speed Nin1 or ABS-operating-time upper-limit speed ratio γ1. Thus, during ABS operation performed by the ABS control device 82 before the vehicle is stopped, the speed ratio can be returned to the largest reduction ratio in a condition where the engine brake force is not excessively applied, so that sufficient driving force of the vehicle when re-started, or sufficient starting response, can be obtained.

According to the electronic control unit 50 of this embodiment, when the input shaft speed Nin or speed ratio γ of the continuously variable transmission 18 is equal to or higher/larger than the predetermined ABS-operating-time upper-limit input shaft speed Nin1 or ABS-operating-time upper-limit speed ratio γ1, the speed ratio γ of the continuously variable transmission 18 is allowed to be changed toward the smallest speed ratio, namely, only upshift is permitted. Therefore, when the input shaft speed Nin or speed ratio γ of the continuously variable transmission 18 is equal to or higher/larger than the ABS-operating-time upper-limit rotational speed Nin1 or ABS-operating-time upper-limit speed ratio γ1, the engine brake force is prevented from being excessively applied, and therefore, the driving wheels 24L, 24R of the vehicle are prevented from locking during ABS operation.

According to the electronic control unit 50 of this embodiment, the ABS-operating-time upper-limit rotational speed Nin1 is the ABS-operating-time upper-limit input shaft speed Nin1 calculated based on the actual vehicle speed V and the ABS-operating-time target input shaft speed Nin*, from the pre-stored relationship (map shown in FIG. 4) between the vehicle speed V and the ABS-operating-time target input shaft speed Nin* and the ABS-operating-time upper-limit rotational speed Nin1 of the continuously variable transmission 18. With the upper-limit rotational speed Nin1 thus determined, when the input shaft speed Nin or speed ratio γ of the continuously variable transmission 18 is equal to or higher/larger than the ABS-operating-time upper-limit rotational speed Nin1 or the ABS-operating-time upper-limit speed ratio γ1, during ABS operation performed by the ABS control device 82, for example, when the accelerator pedal is returned to the original position or a braking operation is performed after the accelerator pedal is kicked down (a kickdown operation), the continuously variable transmission 18 is shifted up so that the actual input shaft speed Nin is made equal to the ABS-operating-time target input shaft speed Nin*, and the actual input shaft speed Nin or the speed ratio γ is reduced toward the ABS-operating-time target input shaft speed Nin* or the ABS-operating-time target speed ratio γ*.

According to the electronic control unit 50 of this embodiment, the ABS-operating-time upper-limit speed ratio γ1 is calculated by dividing the above-mentioned ABS-operating-time upper-limit rotational speed Nin1 by the output shaft speed Nout of the continuously variable transmission 18. Namely, the ABS-operating-time upper-limit speed ratio γ1 is calculated based on the actual vehicle speed V, ABS-operating-time target input shaft speed Nin*, and the output shaft speed Nout of the continuously variable transmission 18, from a pre-stored relationship between the vehicle speed V, ABS-operating-time target input shaft speed Nin*, and the output shaft speed Nout of the continuously variable transmission 18, and the ABS-operating-time upper-limit speed ratio γ1. Therefore, when the speed ratio γ of the continuously variable transmission 18 is equal to or larger than the predetermined ABS-operating-time upper-limit speed ratio γ1 during ABS operation performed by the ABS control device 82, for example, when the accelerator pedal is returned to the original position or a braking operation is performed after the accelerator pedal is kicked down, the continuously variable transmission 18 is shifted up so that the actual speed ratio γ is made equal to the ABS-operating-time target speed ratio γ', and the actual speed ratio γ is reduced toward the ABS-operating-time upper-limit speed ratio γ1.

According to the electronic control unit 50 of this embodiment, when no speed change inhibition request is issued from the ABS control device 82 during ABS operation, the target input shaft speed Nin* or target speed ratio γ* during ABS operation performed by the ABS control device 82 is determined, and speed ratio control is performed so that the input shaft speed Nin or the speed ratio γ becomes equal to the target input shaft speed Nin* or the target speed ratio γ* if the target input shaft speed Nin* or the target speed ratio γ* is lower/smaller than the ABS-operating-time upper-limit rotational speed Nin1 or the ABS-operating-time upper-limit speed ratio γ1. Therefore, when no speed change inhibition request is generated during ABS operation performed by the ABS control device 82, speed ratio control is allowed to be performed in a condition where the target input shaft speed Nin* or the target speed ratio γ* is lower/smaller than the ABS-operating-time upper-limit rotational speed Nin1 or the ABS-operating-time upper-limit speed ratio γ1. Thus, the speed ratio γ can be returned to the largest speed reduction ratio during ABS operation, and sufficient driving force or high starting response can be obtained when the vehicle is re-started.

According to the electronic control unit 50 of this embodiment, when no speed change inhibition request is issued from the ABS control device 82 during ABS operation, and the target input shaft speed Nin* or the target speed ratio γ* is equal to or higher/larger than the ABS-operating-time upper-limit rotational speed Nin1 or the ABS-operating-time upper-limit speed ratio γ1, the target input shaft speed Nin* or the target speed ratio γ* is limited to the ABS-operating-time upper-limit rotational speed Nin1 or the ABS-operating-time upper-limit speed ratio γ1. In this manner, under speed ratio control performed when change of the speed ratio is not inhibited during ABS operation, the target input shaft speed Nin* or the target speed ratio γ* is prevented from exceeding the ABS-operating-time upper-limit rotational speed Nin1 or the ABS-operating-time upper-limit speed ratio γ1, so that the speed ratio is changed at a reduced rate under speed ratio control, namely, the rate of change of the speed ratio is reduced.

According to the electronic control unit 50 of this embodiment, the target speed ratio γ* during ABS operation performed by the ABS control device 82 is obtained by dividing a difference between the largest speed reduction ratio γmax and the actual speed ratio γ by the vehicle speed V, and multiplying the result of division by the vehicle deceleration G, as is understood from Eq. (1) above. The target input shaft speed Nin* during ABS operation performed by the ABS control device 82 is obtained by multiplying the target speed ratio γ* by the output shaft speed Nout of the continuously variable transmission 18. In this manner, the speed ratio γ of the continuously variable transmission 18 is changed at an appropriate rate toward the largest speed reduction ratio γmax.

While one embodiment of the invention has been described in detail with reference to the drawings, the invention may be applied in other forms or embodiments.

While the ABS-operating-time upper-limit rotational speed Nin1 or the ABS-operating-time upper-limit speed ratio γ1 is obtained from the pre-stored relationship shown in FIG. 4 in the above-described embodiment, a certain effect is obtained even if a predetermined fixed value is used. For example, the ABS-operating-time upper-limit rotational value Nin1 may be a value around 1000 rpm.

The speed ratio control system of the above-described embodiment is of a type that determines the target input shaft speed Nin* as a speed change target value, based on the actual vehicle speed V and accelerator operation amount Acc, from the pre-stored relationship shown in FIG. 4. However, the speed ratio control system may be of a torque demand type in which the required driving force is determined based on the vehicle speed V and the accelerator operation amount Acc, the target input shaft speed of the continuously variable transmission 18 and the target throttle opening for providing the required driving force are determined, and speed ratio control is performed so as to achieve the target input shaft speed, while the throttle actuator 38 is controlled so as to achieve the target throttle opening.

The continuously variable transmission 18 of the above-described embodiment is a so-called belt type continuously variable transmission in which the transmission belt 48 is extended between a pair of variable pulleys 42, 46 whose effective diameters are variable, and the speed ratio γ is steplessly or continuously changed. However, it may be another type of continuously variable transmission, such as a so-called traction drive type continuously variable transmission having a pair of cones arranged to be rotated about a common axis, and a plurality of rollers capable of rotating about rotational centers that intersect with the common axis. The rollers are sandwiched between the pair of cones, and the speed ratio can be varied by changing the angles of intersection between the rotational centers of the rollers and the axis.

While an internal combustion engine, such as a gasoline engine or a diesel engine, which generates power through combustion of fuel, for example, is used as the above-described engine 12, another type of prime mover, such as an electric motor, may be used in combination with the engine, or may be employed alone.

While the target input shaft speed Nin* is used as the speed change target value in the above-described embodiment, the invention may be applied to the case where a rotating element, such as the turbine shaft 30 or the crankshaft 13, which rotates with the input shaft 32 is employed. In this case, the speed change target value may be a target turbine speed NT* or a target engine speed NE*, for example.

While the speed ratio control valve 72 of the above-described embodiment is arranged to control the speed ratio of the continuously variable transmission 18 by controlling the amount of hydraulic oil flowing into the primary-side hydraulic cylinder 42c, the invention is not limited to this arrangement. For example, the speed ratio control valve 72 may directly control a primary pressure Pin applied to the primary-side hydraulic cylinder 42c.

While the torque converter 14 equipped with the lock-up clutch 26 is used as the hydraulic power transmission device in the above-described embodiment, the lock-up clutch 26 may not necessarily be provided, or another type of hydraulic power transmission device, such as a fluid coupling having no torque amplifying function, may be used in place of the torque converter 14, or a drive system of a vehicle including an electric motor as a drive source may be employed.

It is to be understood that the above-described embodiment is a mere example, and that the invention may be embodied with various changes, modifications, or improvements based on the knowledge of those skilled in the art to which the invention pertains.

What is claimed is:

1. A speed ratio control device of a vehicular continuously variable transmission for a vehicle having a continuously variable transmission and an antilock brake control device, comprising
a speed ratio controller configured to execute speed change inhibition control for inhibiting at least downshift of the continuously variable transmission during operation of the antilock brake control device, the speed ratio controller being configured to execute the speed change inhibition control when an input shaft speed or a speed ratio of the continuously variable transmission is lower than a predetermined upper limit value.

2. The speed ratio control device of the vehicular continuously variable transmission according to claim 1, wherein the speed ratio controller is configured to permit only upshift of the continuously variable transmission when the input shaft speed or speed ratio of the continuously variable transmission is equal to or higher than the predetermined upper limit value.

3. The speed ratio control device of the vehicular continuously variable transmission according to claim 1, wherein the upper limit value is an upper-limit input shaft speed calculated based on an actual vehicle speed and a target input shaft speed, from a pre-stored relationship between the actual vehicle speed and the target input shaft speed of the continuously variable transmission, and the upper-limit input shaft speed.

4. The speed ratio control device of the vehicular continuously variable transmission according to claim 1, wherein the upper limit value is an upper-limit speed ratio calculated based on an actual vehicle speed, a target input shaft speed of the continuously variable transmission, and an output shaft speed thereof, from a relationship between the vehicle speed, the target input shaft speed and the output shaft speed, and the upper-limit speed ratio.

5. The speed ratio control device of the vehicular continuously variable transmission according to claim 1, wherein:
   the speed ratio controller is configured to determine a target input shaft speed or a target speed ratio during operation of the antilock brake control device, when no speed change inhibition request is generated during operation of the antilock brake control device; and
   the speed ratio controller is configured to execute speed ratio control so as to achieve the target input shaft speed or the target speed ratio, when the target input shaft speed or the target speed ratio is lower than the upper limit value.

6. The speed ratio control device of the vehicular continuously variable transmission according to claim 5, wherein the speed ratio controller is configured to limit the target input shaft speed or the target speed ratio to the upper limit value, when the target input shaft speed or the target speed ratio is equal to or higher than the upper limit value.

7. The speed ratio control device of the vehicular continuously variable transmission according to claim 5, wherein:
   the target speed ratio during operation of the antilock brake control device is a value obtained by dividing a difference between a largest speed reduction ratio and an actual speed ratio by the vehicle speed, and multiplying a result of division by a vehicle deceleration; and
   the target input shaft speed during operation of the antilock brake control device is a value obtained by multiplying the target speed ratio by an output shaft speed of the continuously variable transmission.

* * * * *